(12) United States Patent
Vosburgh et al.

(10) Patent No.: US 7,496,000 B2
(45) Date of Patent: Feb. 24, 2009

(54) WATER SUBMERSIBLE COMMUNICATIONS DEVICES AND METHODS FOR USING THE SAME

(75) Inventors: Frederick Vosburgh, Durham, NC (US); Charles A. Pell, Durham, NC (US); Mathieu P. Kemp, Durham, NC (US)

(73) Assignee: Nekton Research LLC, Durham, NC (US)

( * ) Notice: Subject to any disclaimer, the term of this patent is extended or adjusted under 35 U.S.C. 154(b) by 95 days.

(21) Appl. No.: 11/494,941

(22) Filed: Jul. 28, 2006

(65) Prior Publication Data

US 2008/0192576 A1      Aug. 14, 2008

Related U.S. Application Data

(60) Provisional application No. 60/705,253, filed on Aug. 3, 2005.

(51) Int. Cl.
*H04B 11/00* (2006.01)

(52) U.S. Cl. ....................................................... 367/134

(58) Field of Classification Search .................. 367/134
See application file for complete search history.

(56) References Cited

U.S. PATENT DOCUMENTS

| 4,189,786 | A |   | 2/1980  | Adler |
|-----------|---|---|---------|-------|
| 6,058,071 | A | * | 5/2000  | Woodall et al. .............. 367/134 |
| 6,254,445 | B1|   | 7/2001  | Jones |
| 6,711,095 | B1|   | 3/2004  | Daniels |
| 6,738,314 | B1|   | 5/2004  | Teeter et al. |
| 6,813,218 | B1| * | 11/2004 | Antonelli et al. ............ 367/134 |
| 6,899,583 | B2|   | 5/2005  | Barden |
| 6,961,657 | B1|   | 11/2005 | Wernli et al. |

* cited by examiner

*Primary Examiner*—Dan Pihulic
(74) *Attorney, Agent, or Firm*—Myers Bigel Sibley & Sajovec, PA

(57) ABSTRACT

A water submersible communications device for use on a body of water includes a housing and a communications module. The housing has a geometric centroid. The housing is submersible in and floatable on the body of water. The communications module is mounted on and/or in the housing. A center of buoyancy of the communications device is located substantially at the geometric centroid of the housing.

22 Claims, 10 Drawing Sheets

WATER SUBMERSIBLE COMMUNICATIONS DEVICES AND METHODS FOR USING THE SAME

RELATED APPLICATION(S)

This application claims the benefit of and priority from U.S. Provisional Patent Application Ser. No. 60/705,253, filed Aug. 3, 2005.

STATEMENT OF GOVERNMENT SUPPORT

This invention was made with support under Small Business Innovation Research (SBIR) Program Nos. N68335-04-C-0114, N41756-05-C-4811, and N00014-04-C-0045 awarded by the United States Navy. The Government has certain rights in the invention.

FIELD OF THE INVENTION

The present invention relates to communication devices and, more particularly, to water submersible communications devices.

BACKGROUND OF THE INVENTION

Monitoring littoral seas without being detected can be desirable in times of conflict. In such cases, autonomous submersible monitoring and communications systems can provide much needed intelligence. While such devices can be deployed without detection, communicating the results of monitoring by devices submerged in the sea is problematic. Sonar provides low bandwidth over short ranges and radio communications, at all but the highest powers and lowest data rates, are blocked by salt water. Effective communication requires therefore that an antenna be raised above the sea. A variety of systems have been described for raising an antenna above the sea, but they are either expensive, impractical, or readily detected, making them unsuitable for exporting information without being detected.

SUMMARY OF THE INVENTION

According to embodiments of the present invention, a water submersible communications device for use on a body of water includes a housing and a communications module. The housing has a geometric centroid. The housing is submersible in and floatable on the body of water. The communications module is mounted on and/or in the housing. A center of buoyancy of the communications device is located substantially at the geometric centroid of the housing.

According to some embodiments, a center of mass of the communications device is located at or below the geometric centroid of the housing. According to some embodiments, the housing is substantially spherical and the center of mass of the communications device is spaced apart from the geometric centroid of the housing a distance of no more than 65% of the diameter of the housing at a horizontal midline of the housing.

According to some embodiments, the communications device further includes at least one stabilizer extension extendable from the housing to stabilize the communications device on the body of water.

According to some embodiments, the communications device includes a tilt decoupling assembly and the communications module is movably coupled to the housing by the tilt decoupling assembly. According to some embodiments, the tilt decoupling assembly comprises a suspension mechanism including at least one of a gimbal, a rotatable inner structure, and a hanging member, and the communications module is mounted on the suspension mechanism.

The communications device may include a sensing device mounted on and/or in the housing to sense a parameter external to the communications device.

The communications device may include an energy source mounted on and/or in the housing to power the communications module.

According to some embodiments, the housing is convertible from a collapsed configuration, wherein the housing has a collapsed volume, to an inflated configuration, wherein the housing has an inflated volume that is greater than the collapsed volume, and the communications device further includes an inflator to selectively inflate the housing from the collapsed configuration to the inflated configuration to adjust a buoyancy of the communications device.

According to embodiments of the present invention, a water submersible communications device for use in a body of water having a water surface includes a housing and a communications module. The housing is submersible in the body of water. The housing is convertible from a collapsed configuration, wherein the housing has a collapsed volume, to an inflated configuration, wherein the housing has an inflated volume that is greater than the collapsed volume. The communications module is mounted on and/or in the housing. The communications device further includes an inflator to selectively inflate the housing from the collapsed configuration to the inflated configuration to adjust a buoyancy of the communications device.

According to some embodiments, the communications device is adapted to float from within the body of water to a location at or above the surface of the body of water when the housing is inflated by the inflator from the collapsed configuration to the inflated configuration.

The inflator may be mounted on and/or in the housing.

The communications device may further include a scuttling mechanism to deflate the housing.

According to some embodiments, the inflator includes a chemical-reaction gas generator. The gas generator may cause reaction of a chemical with water to generate an inflation gas.

According to some embodiments, the communications device is adapted to float in air when inflated.

The communications device may include at least one of: an acoustic detector; an acoustic emitter; an optical sensor; an optical emitter; an electromagnetic wave sensor; an electromagnetic wave emitter; a water parameter sensor; and an air parameter sensor.

According to some embodiments, the housing is substantially spherical when in the inflated position.

According to method embodiments of the present invention, a method for providing communications between an unmanned aquatic device in a body of water and a remote receiver includes: maneuvering the unmanned aquatic vehicle to a selected submerged first location in the body of water; deploying a communications device from the aquatic device at the first location; adjusting a buoyancy level of the jettisoned communications device to maneuver the communications device to a selected second location; and sending communications signals from the communications device at the second location to the remote receiver.

According to some embodiments, the second location is at a surface of the body of water.

According to some embodiments, the second location is in the air.

According to some embodiments, adjusting the buoyancy level of the deployed communications device includes inflating a housing of the communications device.

The method may include sensing at least one of a parameter of the communications device, a physical signal, a water parameter, and an air parameter using the communications device.

According to some embodiments of the present invention, a communications device includes a water submersible device having signal detection, signal processing, and signal sending components that detect underwater and/or aerial signals, process signals, and communicate signals to a remote user while the submersible device is floating on or above the water surface. According to some embodiments of the present invention, the submersible device can scuttle by damaging a housing or circuits of the submersible device, or by sinking. The submersible device can be used for monitoring, environmental characterizing, and/or communicating.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
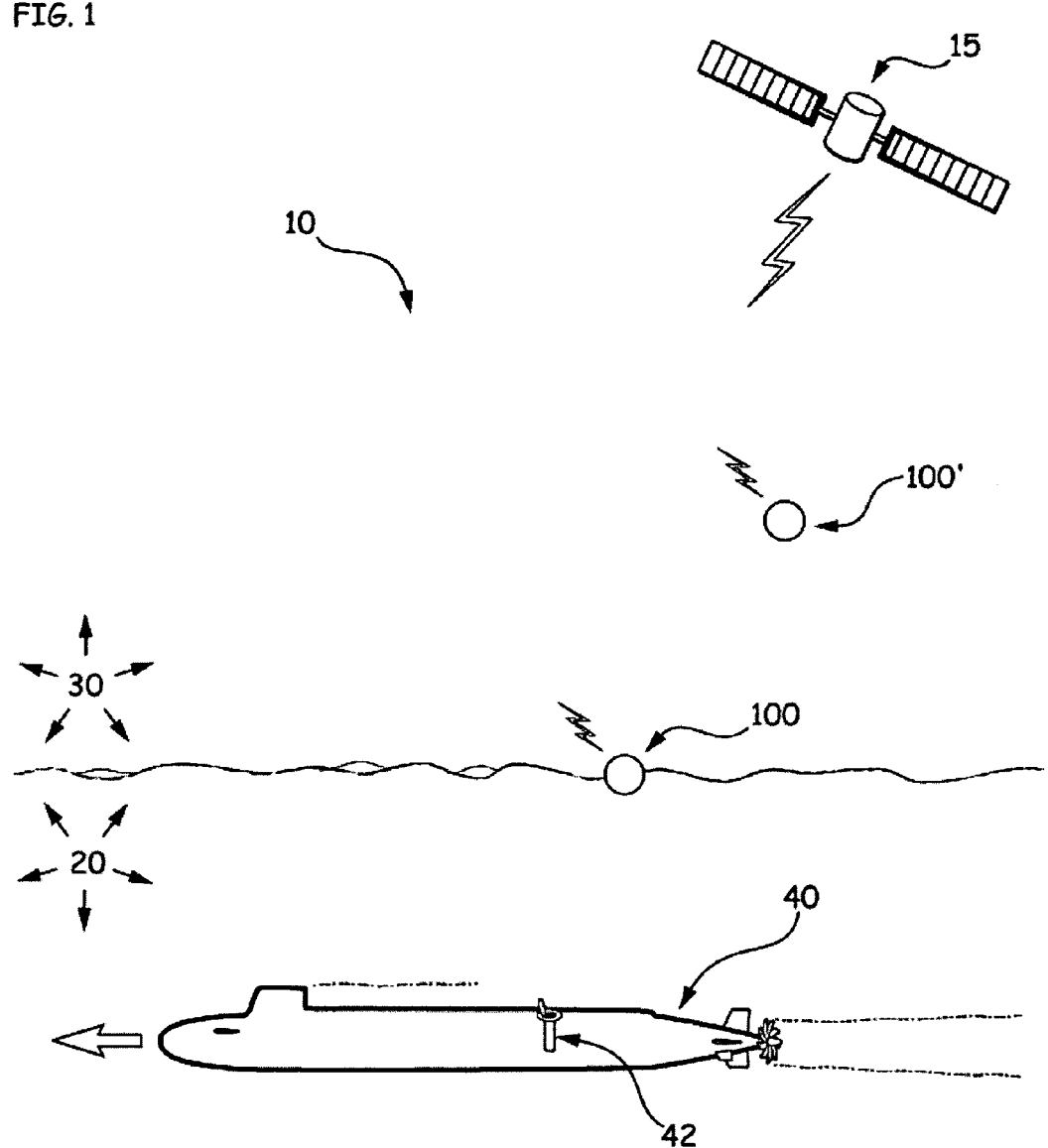
FIG. 1 is a schematic side view of a communications system including a water submersible communications device according to the embodiments of the present invention in a body of water along with a submarine and a remote station.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to embodiments of the invention, deployable devices, systems for their deployment, and methods of using the devices and systems are provided. The devices may be referred to hereinafter as "communications devices" or "data bubbles."

With reference to FIG. 1, a communications system 10 according to embodiments of the present invention is shown therein in a body of water 20 and in the air 30 above the water 20. As illustrated, the system 10 includes a remote station 15 such as a satellite, a deployment vehicle 40 such as a submarine, and a water submersible communications device 100 according to embodiments of the present invention. The communications device 100 is adapted or configured to communicate by sending signals to and/or receiving signals from a remote device (e.g., the remote station 15) from a location proximate or on the surface of the water 20 (as indicated in FIG. 1 by the numeral 100) or from a location in the air 30 above the surface of the water (as indicated in FIG. 1 by the numeral 100'). Systems and methods of the present invention may be used for communications between a submerged object or location and a remote user. In some cases, the communications device 100 is also configured as a sensing device for environmental, oceanographic, intelligence, surveillance, or reconnaissance uses, which sensing is conducted in air 30 or water 20. The system 10 is merely exemplary of systems in accordance with the present invention, and various modifications may be made. For example, the system 10 may used or configured such that the communications device 100 only communicates from the surface of the water 20 or only communicates from the air 30. The system may include a plurality of the communications devices 100.

Figure 2:
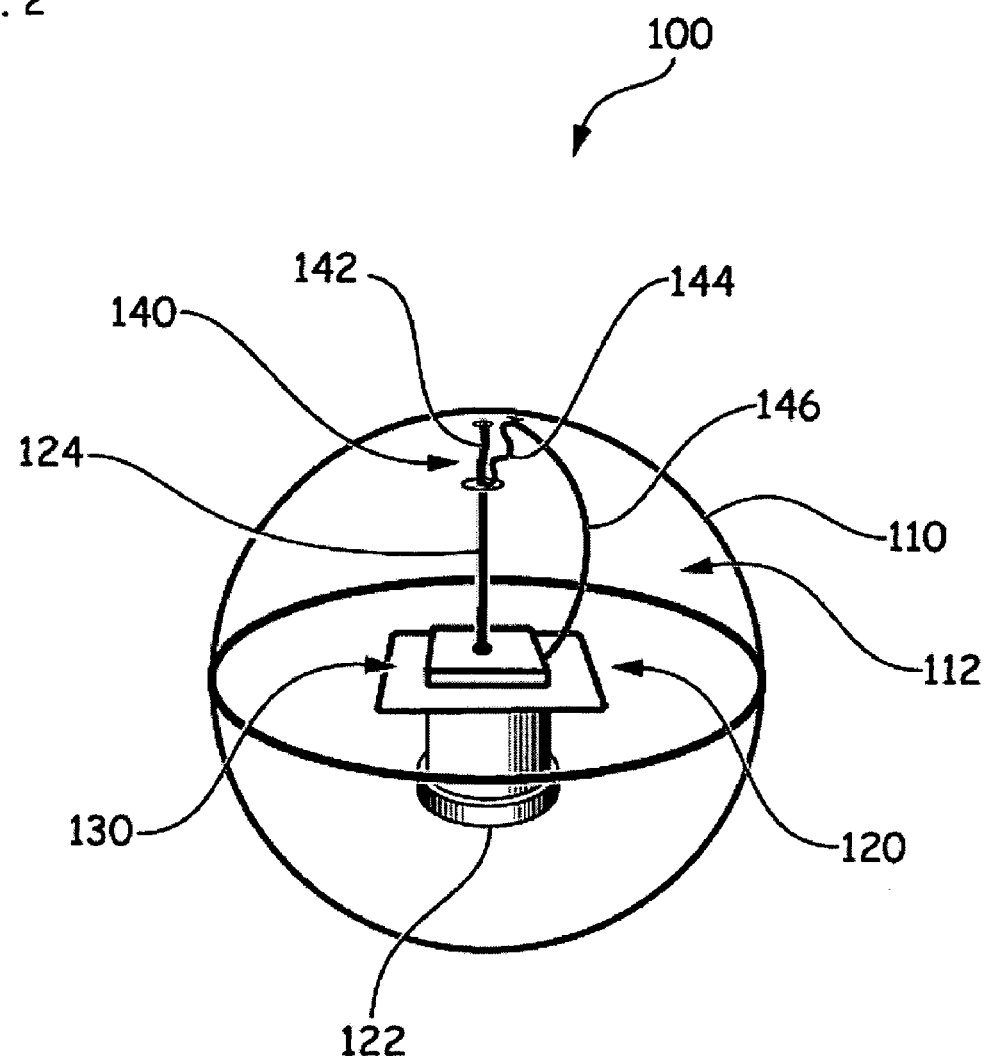
FIG. 2 is an enlarged, more detailed, schematic perspective view of the water submersible communications device of FIG. 1.
Figure 3:
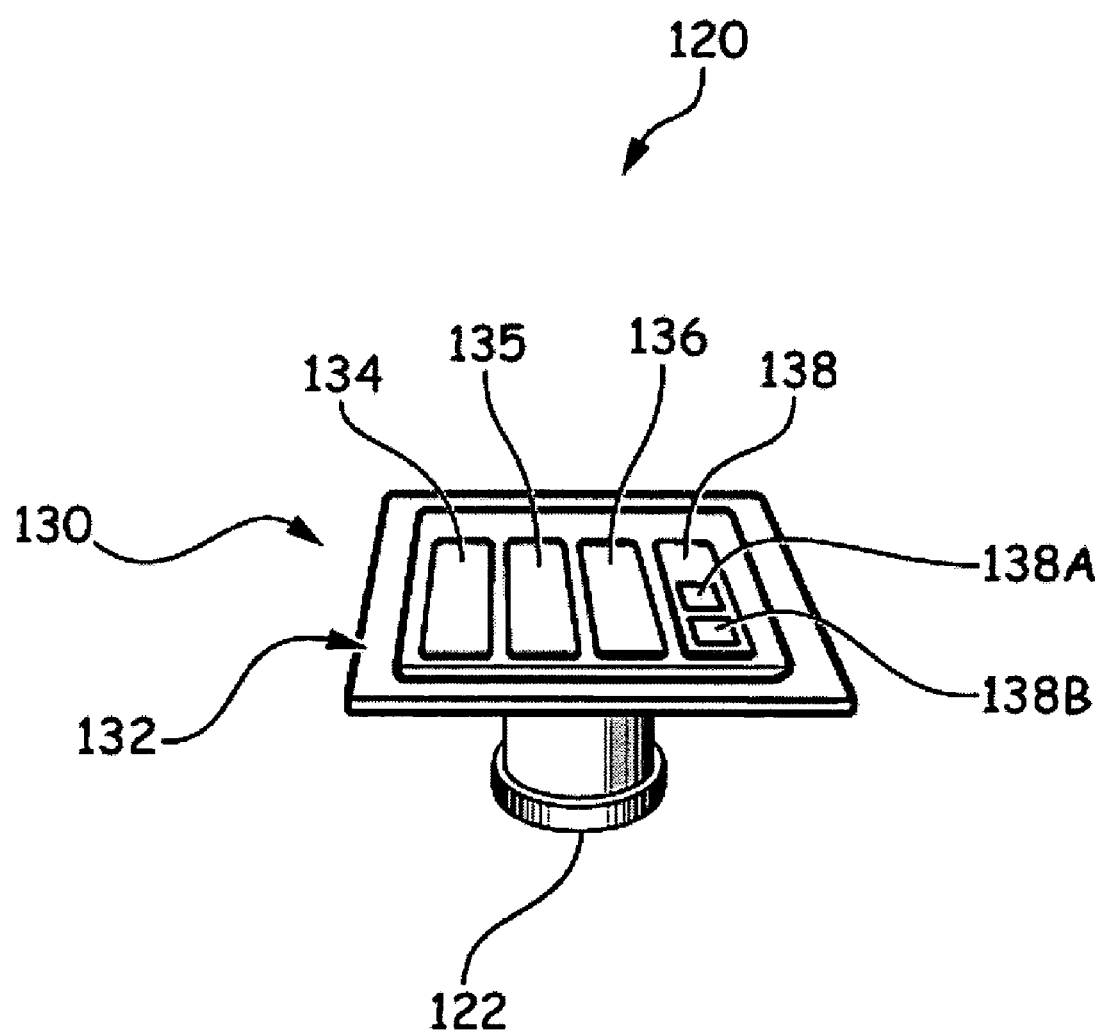
FIG. 3 is a schematic perspective view of a communications module forming a part of the water submersible communications device of FIG. 2.
Figure 4:
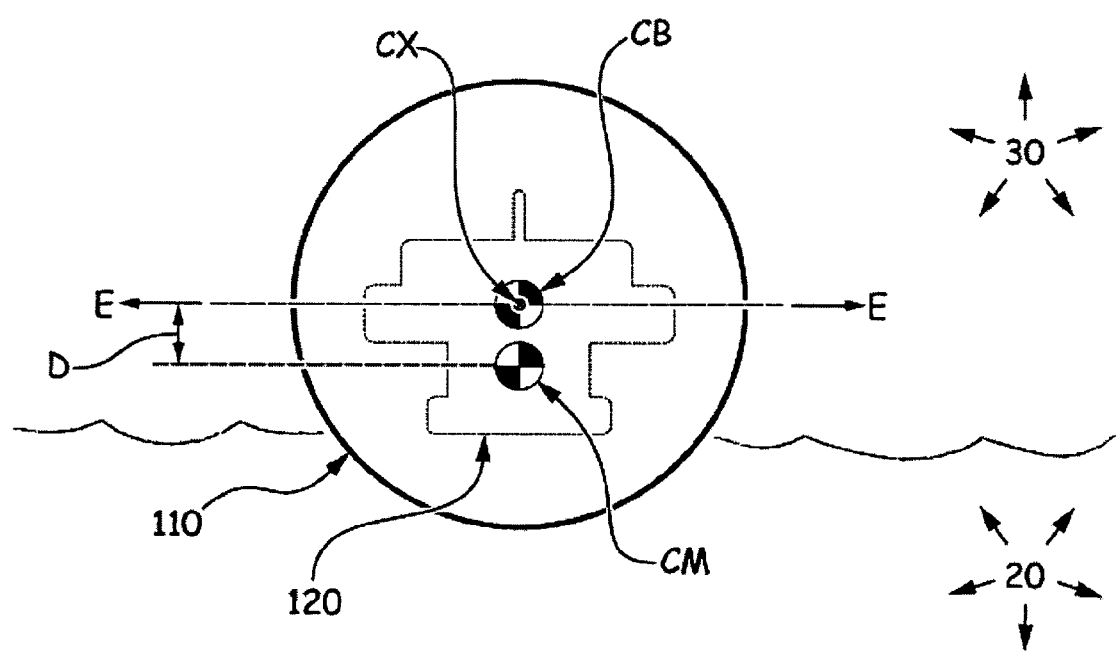
FIG. 4 is a schematic side view of the water submersible communications device of FIG. 2 illustrating a relationship between a center of buoyancy, a geometric centroid and a center of mass of the communications device.

The communications device 100 is shown in further detail in FIGS. 2-4. With reference to FIG. 2, the communications device 100 includes a housing 110, a communications module 120, and a suspension and tilt decoupling system 140.

The housing 110 defines an interior chamber 112. According to some embodiments, the communications module 120 is substantially fully contained in the chamber 112. According to some embodiments, the housing 110 is water submersible such that water is prevented from contacting the communications module 120 (or water sensitive components thereof) during all intended underwater operating conditions. In some cases, the housing 110 or an extension or penetration thereof provides a ground plane for RF communications. According to some embodiments, the housing 110 is spherical as shown. However, other shapes may be employed. According to some embodiments, the housing 100 is formed of a substantially rigid material and/or is constructed so as to remain in a single rigid configuration. Suitable rigid materials for forming the housing 110 may include a polymeric material. According to other embodiments, the housing 110 is formed of a flexible material so that the housing 110 is volumetrically expandable as discussed below.

According to some embodiments, the housing 110 has a total volume in the range of between about 0.1 and 10 cubic meters. According to some embodiments, the housing 110 is a sphere having a diameter of between about 3 and 30 cm.

According to some embodiments, the housing 110 is shaped and constructed for deployment from a launching device. For example, the housing 110 may be adapted and configured to be effectively ejected from an ejector 42 of the submarine 40. Additionally or alternatively, the housing 110 may be adapted and configured to be stored in a container that is ejected from a launching or other deploying device, in which case the communications device 100 may separate from the container following ejection.

With further reference to FIG. 2, the communications module 120 includes an electronics assembly 130, an energy source or power supply 122, and an antenna 124. The power supply 122 may be a battery, for example. The power supply 122 is electrically connected to the electronics assembly 130 to provide power thereto. The antenna 124 may be any suitable type of antenna, such as a monopole, dipole, fractal or other type of radiofrequency (RF) antenna and can be of any length with respect to a desirably sent or received carrier frequency. The antenna 124 is electrically connected to the electronics assembly 130 to send and/or receive communications signals.

The electronics assembly 130 is show in more detail in FIG. 3. The electronics assembly 130 includes a mounting fixture or board 132. A signal converter 134, a processor 135, a signal provider 136, and a transducer 138 are each mounted on the top side of the fixture 132. Alternatively, one or more of the components 134, 135, 136, 138 are mounted on the bottom side of the fixture 132, within the fixture 132, on the housing 110, and/or on another fixture. According to some embodiments, the components 134, 135, 136, 138 and the antenna 124 are mounted in an arrangement that does not substantially impede signal transmission.

One or more of the signal converter 134, the processor 135, the signal provider 136, and the transducer 138 may include a microprocessor.

The converter 134 includes a circuit configured to convert signals. The converter 134 may convert signals between electrical and optical signals (electro-optical converter), between mechanical and electrical signals (mechano-electric converter), between magnetic and electrical signals (magneto-optical converter), and/or between analog and digital signals (analog-digital converter), for example.

The processor 135 may be configured to provide operational control, to store signals, to process signals, and/or to provide signals.

The signal provider 136 can be a component configured to prepare a signal for transmission such as by modulating or otherwise modifying a carrier signal in a manner reflective of desirably transmitted data. In some cases, the signal provider 136 is a pass through type, providing only a carrier signal.

The transducer 138 may include a transmitter 138A. Examples of suitable transmitters include a radio antenna circuit, an optical source, or a sonar transponder. The transmitter 138A may include an acoustic detector, an acoustic emitter, an optical sensor, an optical emitter, an electromagnetic wave sensor, and/or an electromagnetic wave emitter.

In some cases, the transducer 138 includes a sensor 138B. According to some embodiments, the sensor 138B is adapted to sense a parameter of the communications device 100 itself, a parameter external to the communications device 100, or an exogenous signal. According to some embodiments, the sensor 138B is adapted to sense a parameter of the water 20 and/or a parameter of the air 30. According to some embodiments, the sensor 138B includes an acoustic detector, an RF detector, a hydrophone, an optical detector, a camera, and/or an environmental sensor. Detected or transmitted signals may include, for example, radio, magnetic, electric, electromagnetic, mechanical, optical, and/or environmental signals. According to some embodiments, the sensor 138B includes a water parameter sensor and/or an air parameter sensor that detects or measures, with respect to the adjacent surrounding environment (i.e., the water 20 or the air 30), at least one of conductivity, temperature, depth, turbidity, concentration or presence of chlorophyll, concentration or presence of dissolved oxygen, pH, and/or concentration or presence of selected or prescribed matter (which may be of organic, inorganic, chemical, radiological, or biological type, for example). In some embodiments, the sensor 138B includes at least one of: a compass; a GPS component; a velocimeter; and/or an accelerometer.

With reference to FIG. 2, the tilt decoupling system 140 includes a suspension mechanism or hanger 142 (e.g., a flexibly tether) and supplemental connectors (e.g., tethers) 144, 146 that movably couple the communications module 120 to the housing 110. The hanger 142 is an elastic, flexible or articulated coupling that mechanically connects the antenna 124 to the top of the interior surface of the housing 110 so that the communications module 120 is suspended from the housing 110 and can swing freely in the chamber 112 relative to the housing 110. The supplemental tether 144 connects the housing 110 to the antenna 124. The supplemental tether 146 connects the housing 110 to the electronics assembly 130. In use, the tilt decoupling system 140 decouples the communications module 120 from tilting movement of the housing 110 (e.g., due to wave turbulence) so that the communications module 120 tends to remain in a desired operational position (e.g., an upright position). In this manner, the tilt decoupling system 140 decouples the communications module 120 from environmental disturbance so that the communications module 120 is passively maintained in a substantially constant position by gravity. In particular, the antenna 124 may be advantageously maintained in a vertical orientation. The supplemental tethers 144, 146 may serve to limit the range of motion of the communications module 120 relative to the housing 110 and/or to damp such motion.

In some embodiments, the communications device 100 has a density equal to or less than the water 20 or air 30 it displaces.

According to some embodiments and with reference to FIG. 4, the communications device 100 has a center of buoyancy CB and also has a geometric centroid CX defined by the outer dimensions of the housing 110. According to some embodiments and as illustrated, the center of buoyancy CB is located at substantially the same location as the centroid CX. According to some embodiments, the communications device 100 has a center of mass CM and the center of mass CM of the communications device 100 is located at or below the centroid CX of the housing 110. According to some embodiments, the center of mass CM of the communications device 100 is located below the centroid CX of the housing 110. According to some embodiments, the housing 110 is substantially spherical and the center of mass CM is located below the centroid CX and is spaced apart from the centroid CX a distance D of no more than 65% of the diameter of the housing 110 at the horizontal midline E-E of the housing 110.

In use, the foregoing configuration of the centroid CX, center of mass CM, and center of buoyancy CB may serve to keep the communications device 100 properly oriented in the water 20 or the air 30. In particular, when the communications device 100 is floating on the surface of the water, waves and the like may apply forces that would otherwise tend to push or roll the communications device 100 over. Such reorientation may degrade the performance of the antenna 124 or a sensor of the communications device 100. The inventive configuration may serve to retain the communications device 100 upright so that the antenna or sensor remains properly positioned. Such performance may serve to reduce or eliminate the occurrence of communications signal cut out due to oceanic wave disturbance, for example.

As discussed above, the communications device 100 is adapted to float on the surface of the water or in the air. According to some embodiments, the communications device 100 is deployed from an underwater location and floats to the water surface or above. From the floating location, the communications device 100 sends and/or receives wireless communications signals to/from a remote device. The communications device 100 may communicate with the remote device using electromagnetic, electrical, magnetic, optical, and/or acoustic signals. The communications device 100 may also communicate (e.g., acoustically, optically, or magnetic inductively) with a remote device from an underwater location.

According to some embodiments, the communications device 100 communicates with a remote device that is in the water via a tethered connection. For example, according to some embodiments, the remote device is an apparatus or station that deployed the communications device 100, such as the submarine 40 (FIG. 1).

According to some embodiments, the communications device 100 communicates with a remote device that is in the air or on land using RF, optical, or acoustic signals. For example, according to some embodiments, the remote device is an apparatus or station other than the apparatus or station that deployed the communications device 100, such as the remote apparatus 15 (FIG. 1; e.g., a satellite).

The communications between the communications device 100 and the remote device may be one-way or two-way. For example, according to some embodiments, the communications device 100 receives signals from an underwater device such as the submarine 40 and forwards these signals to a device outside of the water such as the remote apparatus 15. Alternatively or additionally, the communications device 100 receives signals from a device outside of the water such as the remote apparatus 15 and forwards these signals to an underwater device such as the submarine 40. In some such embodiments, the communications between the communications device 100 and the remote underwater device are accomplished via acoustic signals and the communications between the communications device 100 and the remote device outside the water are accomplished via RF signals. By way of example, the communications device 100 may receive a communication (e.g., via acoustic transmission) from a node in the Sea Web sonar communications system developed by SPAWAR, US Navy, in San Diego, Calif., and forward the communication to a remote receiver (e.g., via radio transmission).

According to some embodiments, the communications device 100 rises to the surface of the water to obtain information or data that may include: geo-location coordinates, command and control signals, and/or mission updates, and communicates such data underwater device such as a monitoring station or vehicle (e.g., the submarine 40). In some embodiments, the communications device 100 wirelessly communicates such information to the submerged device.

In some embodiments, the communications device 100 sends signals to the remote device including at least one of: a signal detected from another source; a signal from another source that has been processed by the communications device 100; information related to the operation or status of the communications device 100 itself; an environmental parameter sensed by the communications device 100; a forwarded message from another source; an identifier of the communications device 100; the currect time; the current date; and the location of the communications device 100. The communications device 100 may transmit a message containing at least one of: an identifier of the communications device 100; the time a signal or parameter was detected by the communications device 100; a location; a raw signal; a signature; a classification identification; and an estimate of a range or direction to a source of a signal.

According to some embodiments, the communications device 100 is conveyed by a vehicle (e.g., the submarine 40) and released or dispensed therefrom. According to some embodiments, the communications device 100 is released or dispensed from a sensing system or a moored platform.

According to some embodiments, the communications device 100 senses an environmental parameter and/or communicates with a remote device while the communications device 100 is floating submerged in the water, proximate the water surface, or above the water surface.

In some cases, the communications device 100 is released to float to the surface and emit at least one of: an acoustic, optical, or electromagnetic signal. In some embodiments, the communications device 100 is interrogated or commanded by another device to emit a communications signal.

In some cases, the communications device 100 operates in response to a prescribed lapse of time or arrival of a prescribed time. For example, the communications device 100 may begin emitting communications signals or "wake up" to receive communications signals at a pre-programmed time. In some cases, the communications device 100 operates in response to a detected signal (e.g., an interrogation or command signal).

In some cases, the communications device 100 operates in response to a detected event such as a received signal or an environmental event. In an illustrative use, the communications device 100 acoustically detects a passing vessel, for example, by detecting an engine noise from the vessel. According to some embodiments, the communications device 100 sends notification of the detected vessel to a remote receiver. In some cases, the notification includes additional data such as an identifier of the communications device 100, a signal classification, the location where the detection occurred, and/or the time of the detection. Other environmental events that may trigger the communications device 100 to communicate may include, for example, seismic activity, a tsunami, a storm, or any other event detectable by the communications device 100.

According to some embodiments, the communications device 100 while submerged senses an environmental parameter (e.g., a parameter of the water) and thereafter floats to the water surface or into the air to communicate the sensed data to a remote device.

An illustrative method of using the communications device 100 includes sampling water parameters to characterize a sound velocity profile. Further methods of use may include characterizing or profiling water movement, electrical conductivity of the water, water temperature, depth in the water, light intensity, turbidity, chlorophyll concentration in the water, dissolved oxygen concentration in the water, pH of the water, or identification of a type or concentration of material in the water including at least one of: organic, inorganic, chemical, biological, radiological, and toxic material.

According to some embodiments, the communications device 100 is used to aid navigation, such as by providing a signal for direction finding. In some cases, the signal comprises additional information such as location or identification information. In an illustrative example, the communications device 100 is activated to emit sonar.

In some embodiments, the communications device 100 is used to receive data and thereafter communicate the received data or modify its operation based on the received data.

According to some embodiments, the communications device 100 is a single-use device. According to some embodiments, the communications device 100 includes a scuttling system that destroys or sinks the communications device 100, at least in part. For example, the communications device 100 may include a hot wire, an explosive device, and/or a mechanical device that breaches the housing 100 to permit inflow of water or outflow of a lighter than air gas to cause the communications device 100 to sink in the water or air. The communications device 100 may include such a device or an electronic device to destroy a circuit of the communications device 100.

Figure 5:
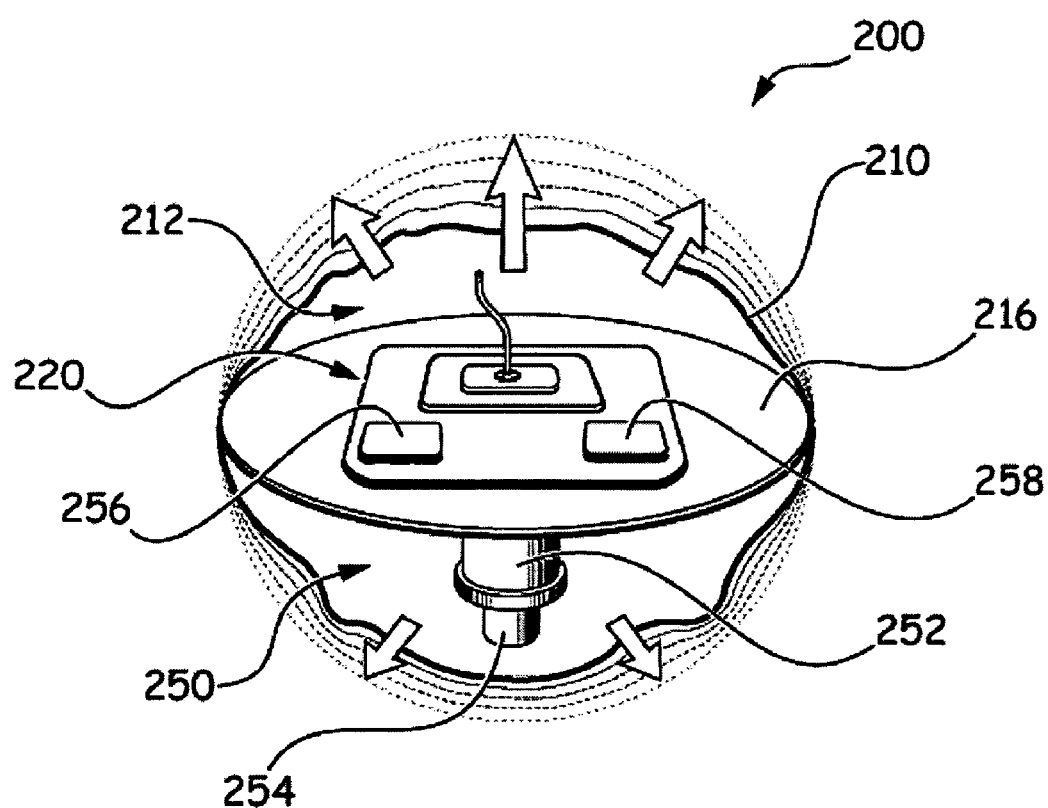
FIG. 5 is a schematic perspective view of a water submersible communications device according to further embodiments of the present invention.

With reference to FIG. 5, a communications device 200 according to further embodiments of the present invention is shown therein. The communications device 200 may be constructed, operated and used in the same manner as described herein for the communications device 100, except as follows. The communications device 200 includes a housing 210 defining an interior chamber 212 wherein a communications module 220 is disposed. The communications module 220 is mounted on a platform 216, which is in turn secured to the housing 210. The housing 210 is at least partly formed of a flexible or deformable material so that it may be volumetrically expanded as indicated by the arrows. According to some embodiments, the housing is formed of a flexible material. According to some embodiments, the housing is formed of a stretchable or elastic material. In some cases, the housing 210 has an irregular shape when not inflated and a spherical or other regular shape when inflated.

The communications device 200 further includes a buoyancy control system 250. The buoyancy control system includes an inflator or gas source 252 and a scuttling device 254, which may also be mounted on the platform 216 and/or the communications module 220. The gas source 252 can be selectively operated to generate a pressurized gas to inflate and thereby expand the volume of the housing 210. In this way, the buoyancy of the communications device 200 can be selectively increased. The gas source 252 can be internal or external to the housing 210. If external, the gas source 252 can be directly attached to the housing 210 or can be contained in or mounted on a connected object, such as an inflator, dispenser or launcher. In some cases, the gas source 252 is detachably attached.

In some cases, a combustible gas such as hydrogen, oxygen, or acetylene is used. In some embodiments, an incombustible gas like helium or carbon dioxide is used.

Any suitable gas source may be used for the gas source 252. In some cases, the gas source 252 is a reservoir-type gas source including a container storing a volume of gas (for example, a cylinder of carbon dioxide) and a structure than can release the stored volume of a gas. In some cases, the gas source 252 is a pump-type gas source including a suitable device that can displace a gas into the housing 210 from outside the housing 210 such as from a releasing device or reservoir.

In some cases, the gas source 252 is a generator-type gas source that includes a suitable structure that can produce a gas-generating reaction. According to some embodiments, the gas source produces the inflation gas by mixing lithium hydride with water to generate hydrogen gas. According to some embodiments, the gas source 252 generates the inflation gas by mixing carbonate mineral with acid to generate carbon dioxide gas, mixing water with sodium-silicon-gel (e.g., available from SiGNa LLC of Manhattan, N.Y.) to hydrolyze the water to generate hydrogen and/or oxygen gas, mixing peroxide with water to generate ozone and/or oxygen, mixing carbide with water to generate acetylene gas, or conducting electrolysis of water to generate hydrogen gas and oxygen gas. According to some embodiments, the gas source 252 includes a mixer that can mix two substances to release hydrogen, helium, acetylene, oxygen, and/or carbon dioxide.

According to some embodiments, the buoyancy control system 250 includes an inflation controller 256 to control gas release, pumping or generation to inflate the housing 210. The inflation controller 256 may operate responsive to signals received from a remote user, a timer, or sensed environmental conditions, for example.

In some embodiments, the buoyancy control system 250 includes a scuttling mechanism or component 254 that can open an outlet or disrupt the housing 210 to release pressurized gas from the chamber 212 and deflate the housing 210. The scuttling component 254 may be controlled by the inflation controller 256 or otherwise. In some cases, the scuttling component 254 is a disruptor that can eject, dislodge, or separate a portion of the communications device 200 to permit release of gas from the housing 210, such as by over pressurizing the housing 210 or releasing a spring forcing separation of portions of the housing 210. In some embodiments, a combusting gas or other substance (e.g., gun powder) is provided to selectively create a damaging internal pressure. Other suitable scuttling mechanisms may include a releasable plug or a hotwire to breach the housing.

In some embodiments the inflation controller 256 can itself provide a scuttling capability. According to some embodiments, the inflation controller is operative to selectively over pressurize the housing 210 to cause a rupture thereof.

In some embodiments, the communications device 200 includes a circuit scuttling component 258 configured to erase, damage, disable, and/or destroy at least one component of the communications device 200, such as by providing a disabling electrical current.

The communications device 200 may be used in the various ways described above with regard to the communications device 100 and may further provide additional operability or functionality. In use, the communications device 200 is initially provided with the housing in a first, at least partially deflated or collapsed position or configuration, wherein the housing 210 has a collapsed volume. The gas source is operated to selectively adjust the buoyancy level of the communications device 100 by inflating the housing 210 to a second expanded or inflated position or configuration, wherein the housing 210 has an inflated volume that is greater than the collapsed volume. The communications device 200 is thereby enabled to float in the water, at the surface of the water, or in the air as desired. The communications device 200 operates to communicate and/or sense as discussed herein with regard to the communications device 100. The communications device 200 may subsequently be scuttled using the scuttling component 254 or the inflation controller 256, for example, so that the communications device 200 drops in the air and/or sinks in the water. The communications module 220 and other components may be located to provide a desired spatial relationship between the center of mass, center of buoyancy and centroid of the communications device 200 (as described above with reference to FIG. 4) when the communications device 200 is in its inflated configuration.

Figure 6:
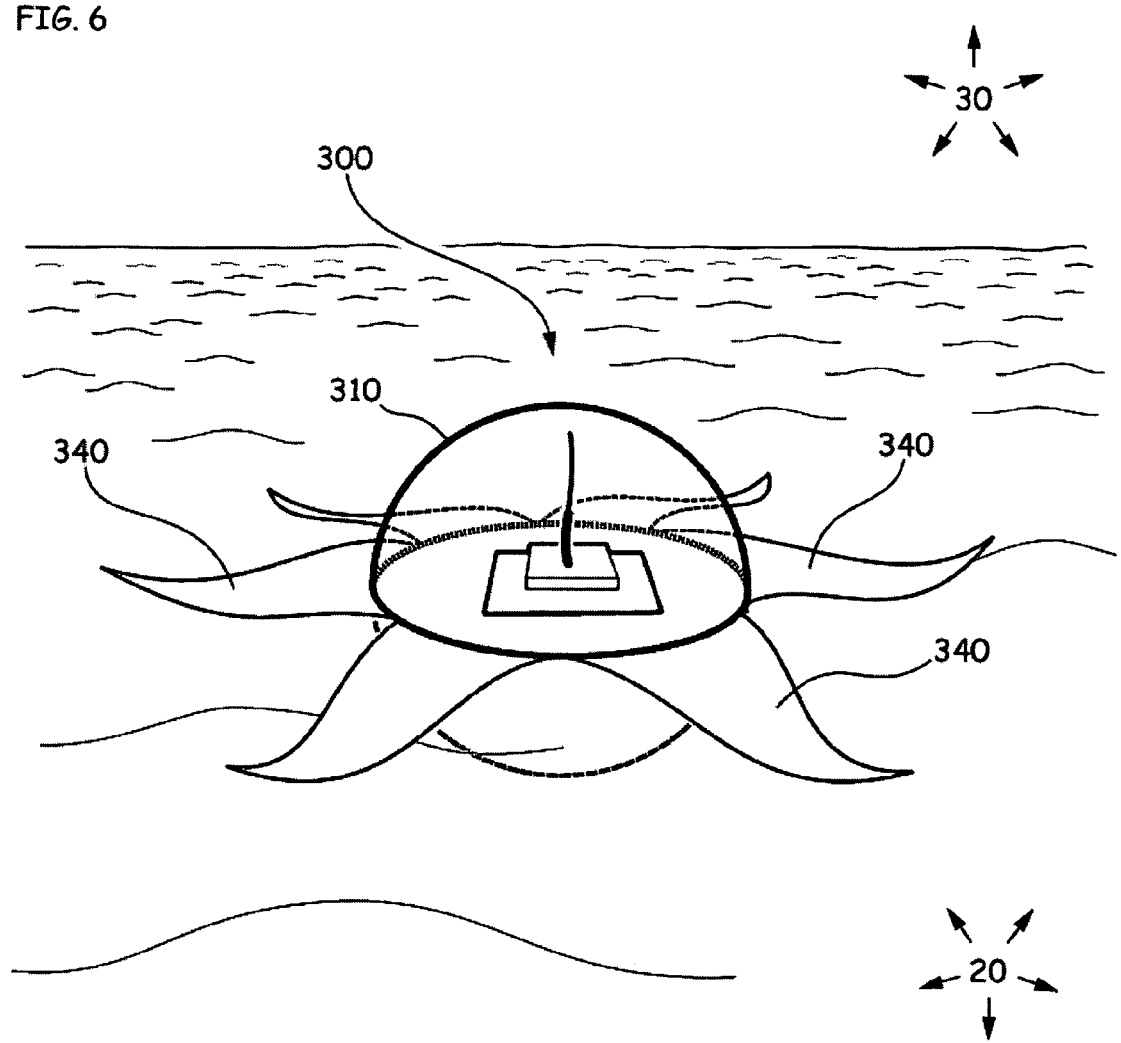
FIG. 6 is a schematic perspective view of a water submersible communications device according to further embodiments of the present invention.

With reference to FIG. 6, a water submersible communications device 300 according to further embodiments of the present invention is shown therein. The communications device 300 may be constructed and used in the same manner as the communications device 200 except as follows. The communications device 300 further includes at least one (six, as shown) stabilizing members 340 connected to the housing 310 at any location, although in some embodiments the stabilizing members 340 are attached at or below the horizontal plane containing the centroid of the housing 310. The stabilizing members 340 may, as shown, take the form of extension arms or panels that stabilize the communications device 300 against wave or wind action. The stabilizing members 340 may serve to damp or resist rotation, translation, tilt and/or distortion of the housing 310.

The stabilizing members 340 may be formed of any suitable material. According to some embodiments, the stabilizing members 340 are formed of a flexible or elastic material. According to some embodiments, the stabilizing members 340 are formed of negatively buoyant material. According to some embodiments, the stabilizing members 340 are formed of positively buoyant material.

According to some embodiments, the housing 310 is inflatable but the stabilizing members 340 are not inflatable. According to some embodiments, the stabilizing members 340 are fully or partly inflatable. According to some embodiments, the stabilizing members 340 are inflatable using a gas source such as the gas source 252.

In some embodiments, the stabilizing members 340 can deform or change position relative to the housing 210, such as by articulating, twisting, bending, stretching, floating, and/or sinking. The stabilizing members 340 can be permanently or detachably attached to the housing 310.

While the stabilizing members 340 are shown and described herein in combination with an inflatable housing 310, according to other embodiments, such stabilizing members may be used with a rigid housing. For example, the communications device 100 may be modified to further include the stabilizing members 340.

Figure 7:
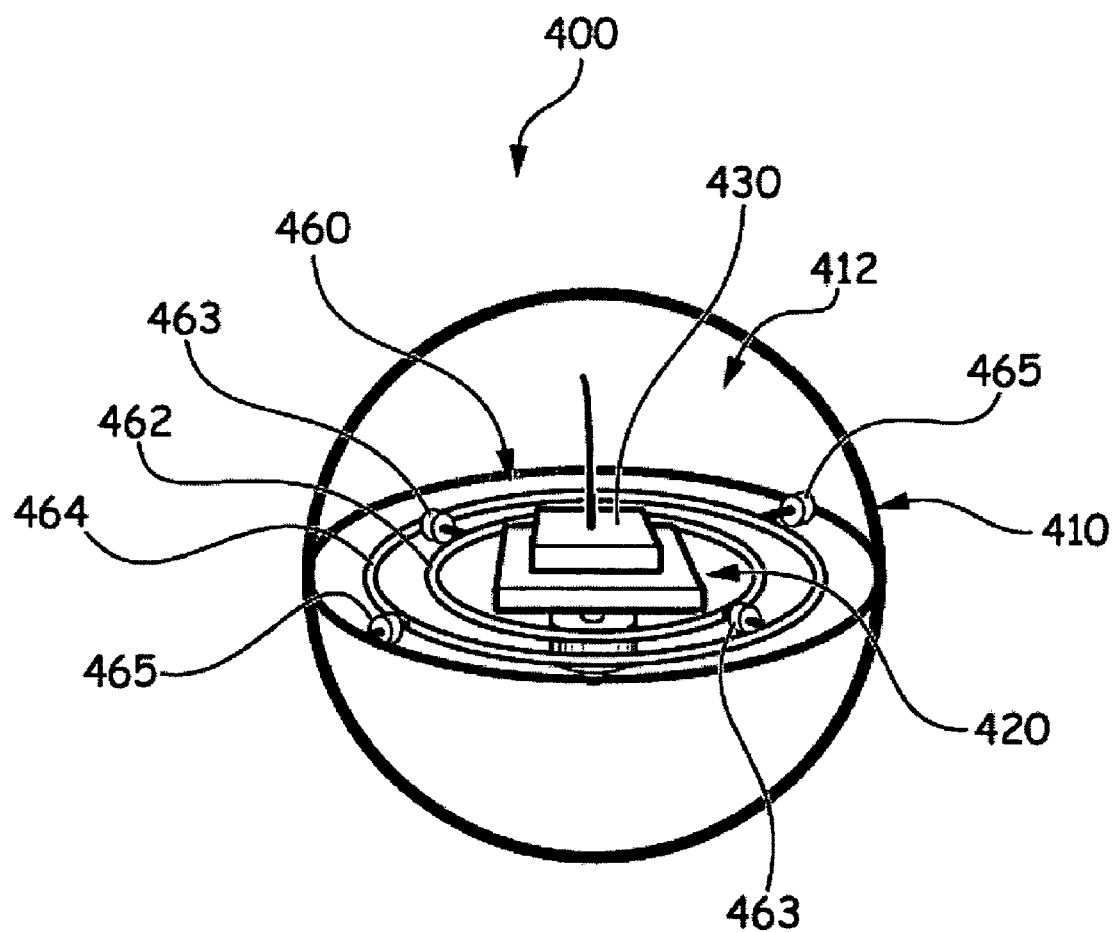
FIG. 7 is a schematic perspective view of a water submersible communications device according to further embodiments of the present invention.

With reference to FIG. 7, a water submersible communications device 400 according to further embodiments of the present is shown therein. The communications device 400 may be constructed and used in the same manner as the communications device 100 except as follows. The communications device 400 uses a tilt decoupling system 460 in the housing chamber 412 in place of the tilt decoupling system 140. The tilt decoupling system 460 is a gimbal-type structure including an inner frame 462 and an outer frame 464. The inner frame 462 is pivotally coupled to the outer frame 464 by pivots 463. The outer frame 464 is pivotally coupled to the housing 410 by pivots 465, which are circumferentially offset from the pivots 463 (e.g., by 90 degrees). The communications module 420 is mounted on the inner frame 462. For example, the electronics assembly 430 can be secured to the inner frame 462. The tilt decoupling system 460 may operate like a compass gimbal on a boat to passively maintain the orientation of the communications module 420 notwithstanding tilting of the housing 410 caused by wave action, for example.

Figure 8:
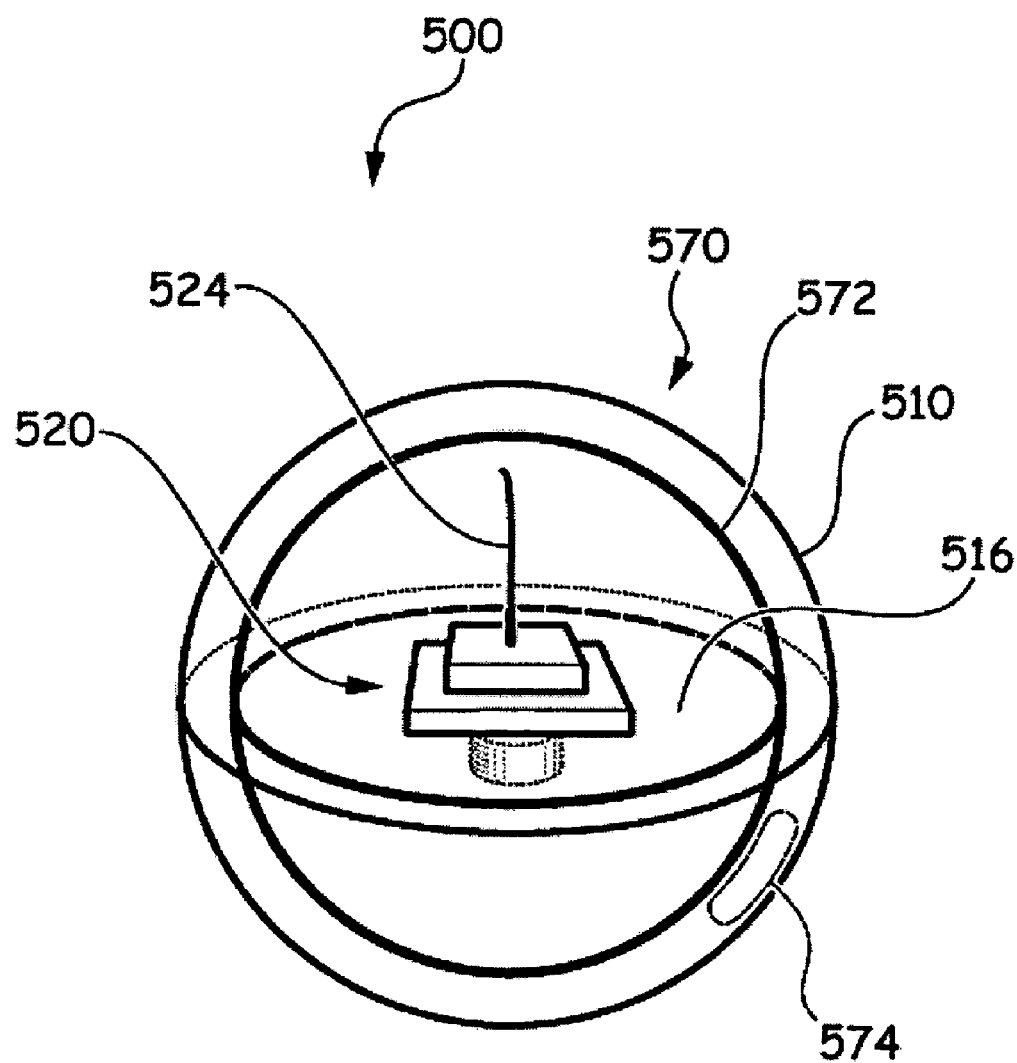
FIG. 8 is a schematic perspective view of a water submersible communications device according to further embodiments of the present invention.

With reference to FIG. 8, a water submersible communications device 500 according to further embodiments of the present invention is shown therein. The communications device 500 may be constructed and used in the same manner as the communications device 100 except as follows. The communications device 500 uses a tilt decoupling system 570 in place of the tilt decoupling system 140. The tilt decoupling system 570 includes an inner housing 572 that can rotate freely with respect to an outer housing 510. The communications module 520 is secured to the inner housing 572 so that it is fully or partially isolated from the tilting of the outer housing 510. For example, the communications module 520 may be mounted on a platform 516 that is secured to the inner housing 572. According to some embodiments, the tilt decoupling system 570 further includes a decoupling agent or member 574 interposed between the inner housing 572 and the outer housing 510. The decoupling agent or member 574 may be, for example, oil, water, or a roller element set to reduce rotational coupling.

Communications devices according to embodiments of the present invention may incorporate two or more of the tilt decoupling systems described herein. In some embodiments, the communication device comprises a gimbal-damper that is passive and responds to gravity, or is active and responds to gyroscopic momentum.

Figure 9:
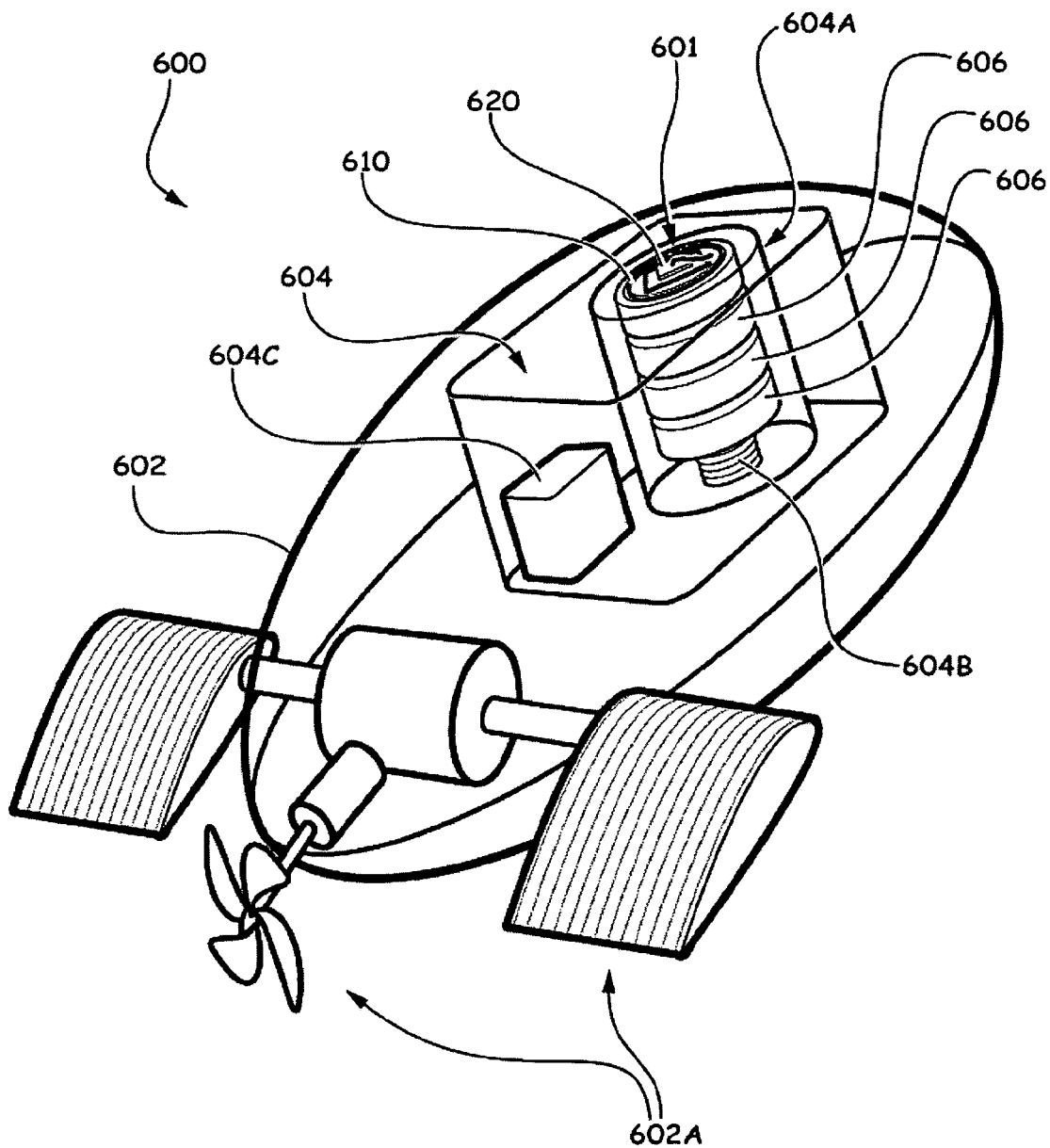
FIG. 9 is a schematic perspective view of a water submersible communications device according to further embodiments of the present invention.

With reference to FIG. 9, a water submersible communications device 600 according to further embodiments of the present is shown therein. The communications device 600 may be constructed and used in the same manner as the communications device 100 except as follows. The communications device 600 includes a delivery system 602. The delivery system 602 may comprise a self-propelled unmanned aquatic vehicle. The delivery system 602 includes a drive and navigation system 602A and is configured to selectively deliver, carry, drop, propel or otherwise move the communications device 600 to a desired location. Examples of suitable delivery systems include a submersible vehicle, a surface vessel, and an aircraft. For example, the delivery system 602 may include an undersea glider or hybrid vehicle, such as the fin-propelled glider developed by Nekton Research LLC, in Durham, N.C. Another example is a sea glider such as that developed by the Applied Physics Laboratory of the University of Washington, Seattle, Wash. In some embodiments, the delivery system includes a surface or air craft, such as ground robots sold by iRobot of Cambridge Mass., or an unmanned aerial vehicle, such as the Global Hawk from Northrup Grumman, Palmdale, Calif.

The communications device 600 further includes a dispenser 604, which includes a magazine 604A, an advance mechanism 604B, a controller 604C, and one or more containers 606. Each container 606 is stored in the magazine and the dispenser 604 is operable to selectively release, jettison or eject the container 606 from the communications device 600. The container 606 may be of any suitable shape such as cylindrical, prismatic, or at least partly spherical. A communications module 620 corresponding to the communications module 120 may be mounted in each container 606. The container may serve to protect and enclose the communications module 620 to exclude water therefrom. The containers 606 may also assist in stowing, handling, nesting, aligning, and stacking the protected communications modules 620 in the delivery system 602, and dispensing the protected communications modules 620 from the delivery system 602.

According to some embodiments, each container 606 contains a secondary communications device 601 including a communications module 620 and a housing 610. For example, each secondary communications device 601 may be constructed as described herein with regard to the communications devices 100, 200, 300, 400, 500, 700.

The delivery system 602 may be maneuvered to transport a container 606 including a communications module 620 to a desired location. The container 606 is then jettisoned from the delivery system 602 by the dispenser 604. According to some embodiments, the container 606 is then separated from a secondary communications device 601 therein, which includes the communications module 620. The secondary communications device 601 can thereafter be used in the various ways described herein. According to some embodiments, the secondary communications device 601 is a selectively inflatable device as described herein with regard to the communications device 200. After separation from the container 606, the inflatable secondary communications device 601 is selectively inflated to adjust its buoyancy level to thereby maneuver the secondary communications module 601 to a desired depth in the water or to a desired height above the water. According to some embodiments, no separable container 606 is provided and the secondary communications module 601 is directly stored in and jettisoned from the dispenser 604.

According to other embodiments, water submersible communications devices including a dispenser as described above may take the form of or be used as a monitoring station, a moored or anchored platform, a vehicle such as a submarine, or a submerged, floating, or drifting object.

Figure 10:
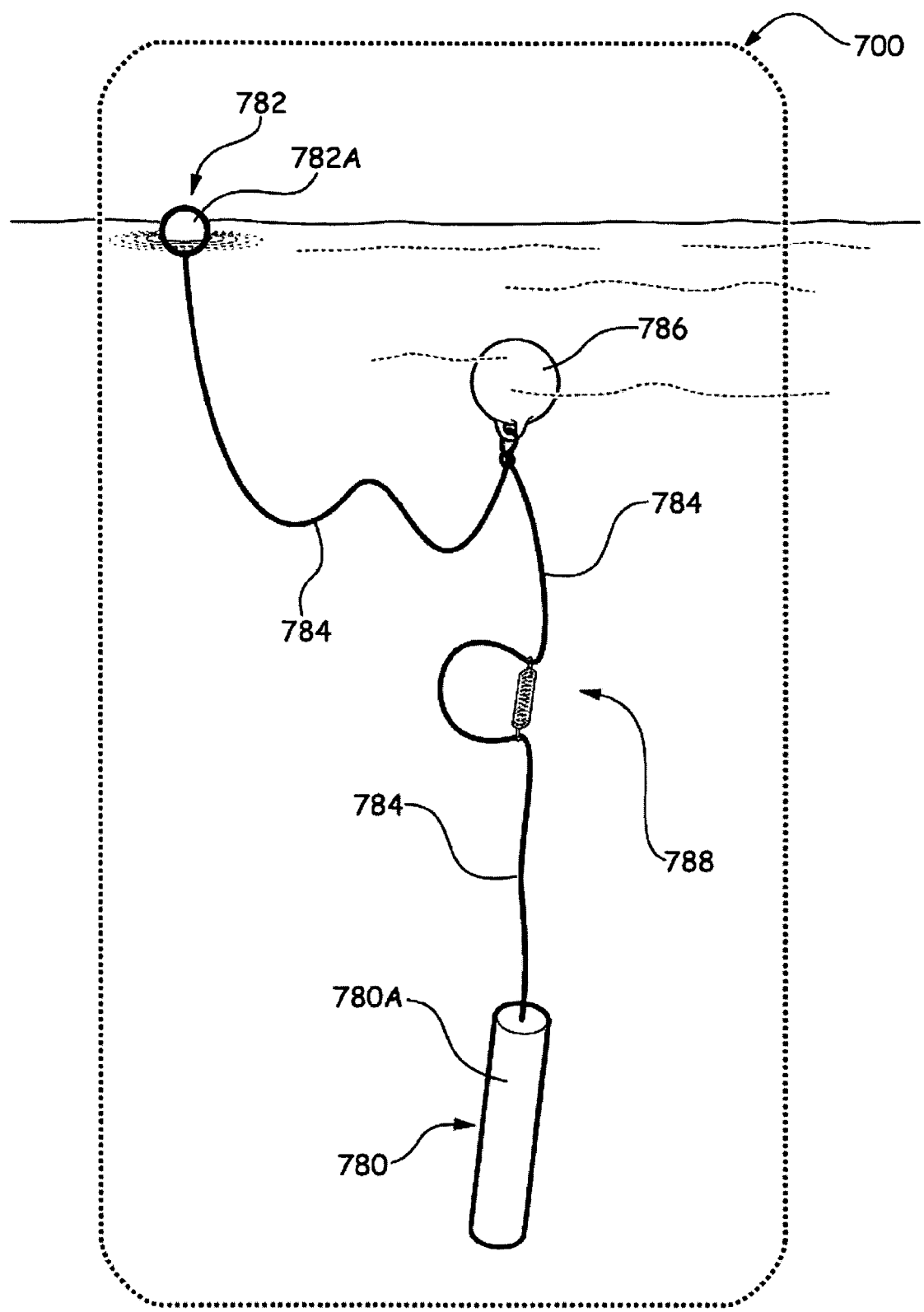
FIG. 10 is a schematic side view of a water submersible communications device according to further embodiments of the present invention.

With reference to FIG. 10, a water submersible communications device 700 according to further embodiments of the present is shown therein. The communications device 700 may be constructed and used in the same manner as the communications device 100 except as follows. The communications device 700 includes a first unit 780, a second unit 782, stress reliever unit 786, a tether 784, and damper 788. The first unit 780 includes a water submersible housing 780A which may contain a transducer and/or other electronic components of the communications device 700. The second unit 782 includes a water submersible housing 782A which may contain an antenna and/or other electronic components of the communications device 700. In some embodiments, the tether 784 includes an element (e.g., an insulated conductive wire) that can transmit force, power, and/or communications signals. In some embodiments, the tether 784 includes an electrical or fiber optic cable that enables the first unit 780 to communicate with the second unit 782 using electrical or fiber optic signals.

The stress reliever 786 is mounted on the tether 784 or connects segments of the tether 784. The stress reliever 786 may include a float that can at least partly offset negative or positive buoyancy of the first unit 780 and, thereby, can mitigate the effect on communications by the communications device 700 due to wave action. The damper 788 may further serve to isolate the first unit from jerking forces on the tether 784.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A water submersible communications device for use on a body of water, the communications device having a center of buoyancy and comprising:
   a housing having a geometric centroid, wherein the housing is submersible in and floatable on the body of water; and
   a communications module mounted on and/or in the housing;
   wherein a center of buoyancy of the communications device is located substantially at the geometric centroid of the housing.

2. The communications device of claim 1 wherein a center of mass of the communications device is located at or below the geometric centroid of the housing.

3. The communications device of claim 2 wherein the housing is substantially spherical and the center of mass of the communications device is spaced apart from the geometric centroid of the housing a distance of no more than 65% of the diameter of the housing at a horizontal midline of the housing.

4. The communications device of claim 1 wherein the housing is substantially spherical.

5. The communications device of claim 1 including at least one stabilizer extension extendable from the housing to stabilize the communications device on the body of water.

6. The communications device of claim 1 including a tilt decoupling assembly, wherein the communications module is movably coupled to the housing by the tilt decoupling assembly.

7. The communications device of claim 6 wherein the tilt decoupling assembly comprises a suspension mechanism including at least one of a gimbal, a rotatable inner structure, and a hanging member, and the communications module is mounted on the suspension mechanism.

8. The communications device of claim 1 including a sensing device mounted on and/or in the housing to sense a parameter external to the communications device.

9. The communications device of claim 1 including an energy source mounted on and/or in the housing to power the communications module.

10. The communications device of claim 1 wherein:
the housing is convertible from a collapsed configuration, wherein the housing has a collapsed volume, to an inflated configuration, wherein the housing has an inflated volume that is greater than the collapsed volume; and
the communications device further includes an inflator to selectively inflate the housing from the collapsed configuration to the inflated configuration to adjust a buoyancy of the communications device.

11. A water submersible communications device for use in a body of water having a water surface, the communications device comprising:
a housing that is submersible in the body of water, wherein the housing is convertible from a collapsed configuration, wherein the housing has a collapsed volume, to an inflated configuration, wherein the housing has an inflated volume that is greater than the collapsed volume;
a communications module mounted on and/or in the housing; and
an inflator to selectively inflate the housing from the collapsed configuration to the inflated configuration to adjust a buoyancy of the communications device;
wherein the communications device is adapted to float in air when inflated.

12. The communications device of claim 11 wherein the communications device is adapted to float from within the body of water to a location at or above the surface of the body of water when the housing is inflated by the inflator from the collapsed configuration to the inflated configuration.

13. The communications device of claim 11 wherein the inflator is mounted on and/or in the housing.

14. The communications device of claim 11 wherein the inflator is detachable from the housing.

15. The communications device of claim 11 further including a scuttling mechanism to deflate the housing.

16. The communications device of claim 11 wherein the inflator includes a chemical-reaction gas generator.

17. The communications device of claim 16 wherein the gas generator causes reaction of a chemical with water to generate an inflation gas.

18. The communications device of claim 11 including at least one of: an acoustic detector; an acoustic emitter; an optical sensor; an optical emitter; an electromagnetic wave sensor; an electromagnetic wave emitter; a water parameter sensor; and an air parameter sensor.

19. The communications device of claim 11 wherein the housing is substantially spherical when in the inflated configuration.

20. A method for providing communications between an unmanned aquatic device in a body of water and a remote receiver, the method comprising:
maneuvering the unmanned aquatic vehicle to a selected submerged first location in the body of water;
deploying a communications device from the aquatic device at the first location;
adjusting a buoyancy level of the jettisoned communications device to maneuver the communications device to a selected second location; and
sending communications signals from the communications device at the second location to the remote receiver;
wherein the second location is in the air.

21. The method of claim 20 wherein adjusting the buoyancy level of the deployed communications device includes inflating a housing of the communications device.

22. The method of claim 20 including sensing at least one of a parameter of the communications device, a physical signal, a water parameter, and an air parameter using the communications device.

* * * * *